US011940108B1

(12) United States Patent
Loomis

(10) Patent No.: US 11,940,108 B1
(45) Date of Patent: Mar. 26, 2024

(54) EXPANDABLE ICICLE LIGHT STRING FOR SPANNING STRUCTURES OF VARIOUS DIMENSIONS

(71) Applicant: Seasons 4, Inc., Toano, VA (US)

(72) Inventor: Jason Loomis, Decatur, GA (US)

(73) Assignee: Seasons 4, Inc., Toano, VA (US)

( * ) Notice: Subject to any disclaimer, the term of this patent is extended or adjusted under 35 U.S.C. 154(b) by 0 days.

(21) Appl. No.: 18/475,436

(22) Filed: Sep. 27, 2023

(51) Int. Cl.

| | |
|---|---|
| ***F21S 4/26*** | (2016.01) |
| ***F21S 9/03*** | (2006.01) |
| ***F21V 21/008*** | (2006.01) |
| ***F21V 21/08*** | (2006.01) |
| ***F21V 21/18*** | (2006.01) |
| ***F21V 23/02*** | (2006.01) |
| ***F21V 23/06*** | (2006.01) |
| ***F21W 121/00*** | (2006.01) |
| ***F21Y 115/10*** | (2016.01) |

(52) U.S. Cl.
CPC ................. *F21S 4/26* (2016.01); *F21S 9/032* (2013.01); *F21V 21/008* (2013.01); *F21V 21/0832* (2013.01); *F21V 21/18* (2013.01); *F21V 23/023* (2013.01); *F21V 23/06* (2013.01); *F21W 2121/004* (2013.01); *F21W 2121/006* (2013.01); *F21Y 2115/10* (2016.08)

(58) Field of Classification Search
CPC ........... F21S 4/26; F21S 9/032; F21V 21/008; F21V 21/0832; F21V 21/18; F21V 23/023; F21V 23/06
See application file for complete search history.

(56) References Cited

U.S. PATENT DOCUMENTS

| | | | | |
|---|---|---|---|---|
| 7,249,866 | B1 * | 7/2007 | Tai | F21V 21/008 362/147 |
| 11,293,605 | B1 * | 4/2022 | Massinello | F21V 21/088 |
| 2017/0191627 | A1 * | 7/2017 | Chen | F21V 23/001 |
| 2018/0202619 | A1 * | 7/2018 | Dedene | F21V 23/06 |
| 2019/0003667 | A1 * | 1/2019 | Marasco | A41D 27/085 |
| 2020/0200343 | A1 * | 6/2020 | Chen | H05B 47/19 |
| 2022/0026031 | A1 * | 1/2022 | Chen | F21V 23/06 |
| 2022/0381408 | A1 * | 12/2022 | Loomis | F21V 21/008 |

* cited by examiner

*Primary Examiner* — Bryon T Gyllstrom
(74) *Attorney, Agent, or Firm* — Kinney & Lange, P.A.

(57) ABSTRACT

Apparatus and associated methods relate to an expandable light string that can span various length dimensions. The expandable light string has a flexible backbone cable, a plurality of lighting elements and single expandable member. The flexible backbone cable has a plurality of conductive wires extending and providing electrical conduction along a length between a first end and a second end of the flexible backbone cable. Each of the plurality of lighting elements is conductively coupled to at least two of the plurality of conductive wires of the flexible backbone cable so as to illuminate in response to receiving electrical operating power therefrom. The single expandable member is coupled at a plurality of coupling locations to the flexible backbone cable along the length thereof. The single expandable member is configured to expand or contract so as to change a length dimension of the expandable light string.

22 Claims, 6 Drawing Sheets

EXPANDABLE ICICLE LIGHT STRING FOR SPANNING STRUCTURES OF VARIOUS DIMENSIONS

BACKGROUND

Decorative light strings are used to communicate a joy of a holiday season, to draw attention to merchandise, or to simply decorate or adorn an object. Decorative light strings can be used both indoors and outdoors. Decorative light strings have been used residentially to adorn trees, shrubs, eaves of houses, and balconies. Commercial businesses can use decorative light strings to provide festive atmospheres at their places of business.

Often light strings are placed on trees, shrubs, balconies, and eaves of houses shortly before a festival and/or holiday season, and then removed after the festival and/or holiday season has ended. Eaves of houses, trees, and shrubs offer wonderful opportunities to share one's holiday joy for those who live in houses. Eaves of houses are of various lengths depending on the size and style of the house and the roof. For those who live in condominiums and apartments, balconies offer a wonderful opportunity to display one's holiday joy to those who live nearby. Typically, balconies have railings that provide safety for those who use them. These railings are often constructed in a manner that presents opportunity to serve also as a support structure for decorations and lights. But balconies come in myriad different sizes and railings are constructed in many different manners.

This disclosure is directed to providing elastic expansion capabilities to decorative light strings, so as to permit a light string to be quickly and easily hung from structures, such as eaves of houses and railings of balconies of various dimensions.

SUMMARY

Methods and associated apparatus relate to an expandable light string. The expandable light string includes a flexible backbone cable, a plurality of lighting elements, and a single expandable member. The flexible backbone cable having a plurality of conductive wires extending and providing electrical conduction along a length between a first end and a second end of the flexible backbone cable. The plurality of conductive wires is configured to receive electrical operating power from an electrical power source. Each of plurality of lighting elements is conductively coupled to at least two of the plurality of conductive wires of the flexible backbone cable so as to illuminate in response to receiving electrical operating power therefrom. The single expandable member coupled at a plurality of coupling locations to the flexible backbone cable along the length thereof. The expandable member is configured to expand, in response to a tensile force applied to first and second ends of the single expandable member, so that a length between the first and second ends of the single expandable member increases, and to contract, in response to a reduction in the tensile force applied to the first and second ends of the single expandable member, so that the length between the first and second ends of the single expandable member decreases. A distance between the first and second ends of the flexible backbone cable changes in response to changes in the length of the single expandable member.

DETAILED DESCRIPTION

Apparatus and associated methods relate to an expandable light string that can span various length dimensions. The expandable light string has a flexible backbone cable, a plurality of lighting elements and single expandable member. The flexible backbone cable has a plurality of conductive wires extending and providing electrical conduction along a length between a first end and a second end of the flexible backbone cable. Each of the plurality of lighting elements is conductively coupled to at least two of the plurality of conductive wires of the flexible backbone cable so as to illuminate in response to receiving electrical operating power therefrom. The single expandable member is coupled at a plurality of coupling locations to the flexible backbone cable along the length thereof. The single expandable member is configured to expand or contract so as to change a length dimension of the expandable light string.

Figure 1A:
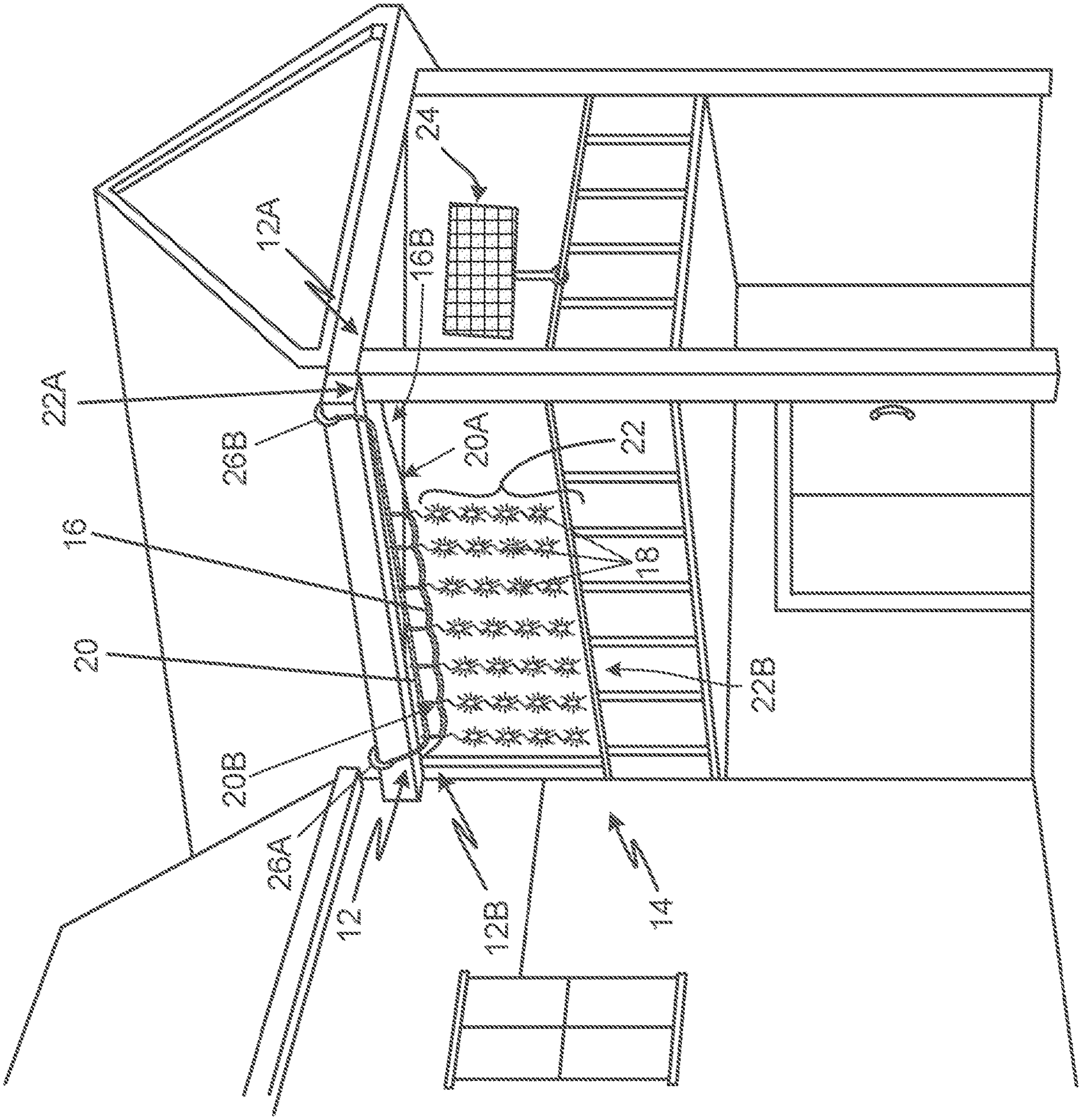
FIGS. 1A-1B are perspective views of eaves of a house and a balcony, respectively, to each of which is attached an expandable light string.
Figure 1B:
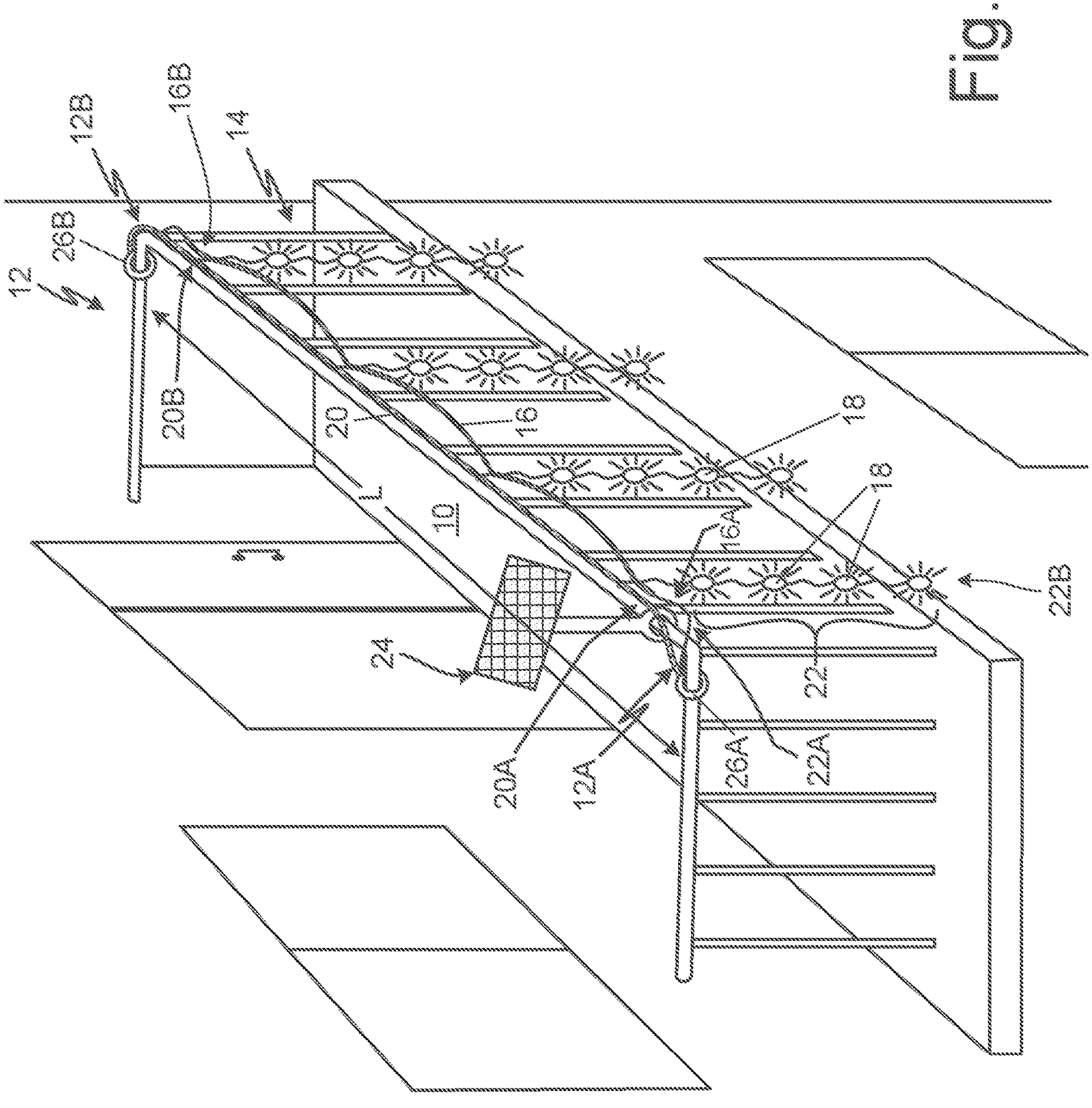

FIGS. 1A and 1B are perspective views of eaves of a house and a balcony, respectively, to each of which is attached an expandable light string. In FIG. 1A, eaves 8 of house 9 has expandable light string 14 attached thereto. In FIG. 1B, balcony 10 has railing 12 to which expandable light string 14 is attached. Expandable light string 14 includes flexible backbone cable 16, lighting elements 18, and elastic member 20. Flexible backbone cable 16 is coupled to elastic member 20 such that a distance between ends 16A and 16B of flexible backbone cable 16 changes in response to changes in a length dimension L of elastic member 20. First and second ends 20A and 20B of elastic member 20 are connected to first and second ends 12A and 12B, respectively, of railing 12, thereby attaching expandable light string 14 thereto. Elastic member 20 is configured to expand (i.e., stretch) from a natural dimension $L_{NAT}$ (i.e., it's minimum dimension) up to a maximum stretched dimension $L_{MAX}$ in response to a tensile force applied to the first and second ends 20A and 20B of elastic member 20. By stretching elastic member 20 in this way and coupling its first and second ends 20A and 20B to first and second ends 12A and 12B of railing 12, elastic member 20 will span (i.e., have a length dimension commensurate with length $L_{RAILING}$ of) railing 12.

Flexible backbone cable 16 includes electrical conductors extending along a length between first and second ends 16A and 16B of flexible backbone cable 16 so as to provide such electrical operating power to lighting elements 18 connected thereto. Lighting elements 18 are typically Light Emitting Diodes (LEDs), but can be any other electrically illuminating device, such as, for example, incandescent bulbs, etc. In the depicted embodiment, lighting elements 18 are distributed along icicle tap strings 22, which are connected to flexible backbone cable 16. In such an embodiment, expandable light string 14 is designed to appear as a series of icicles hanging from railing 12. Each of icicle tap strings 22 includes a subset of lighting elements 20 distributed thereon.

Each of the icicle tap strings 22 has a first end 22A coupled to flexible backbone cable 16 and extends to a second end 22B, giving the appearance of a hanging icicle.

Each of icicle tap strings 22 has electrical conductors that are conductively connected to those of flexible backbone cable 16 so as to receive electrical operating power therefrom and to provide the electrical operating power received to lighting elements 20 distributed along icicle tap strings 22. The plurality of conductive wires of flexible backbone cable 16 are configured to receive electrical operating power from a power source. In the FIG. 1 depiction, solar power converter 24 is providing power to expandable light string 14. Various other power sources can provide power to expandable light string 14, such as, for example, batteries, standard AC line power, low voltage DC power converters, etc. In some embodiments, power sources can be used in combination. For example, solar power converter can include a battery which is charge by solar power converter during daytime hours, and then provides power to expandable light string during nighttime hours. Such power sources can be hardwired to expandable light string 14 or connected via electrical connectors thereto.

Figures 2A, 2B:
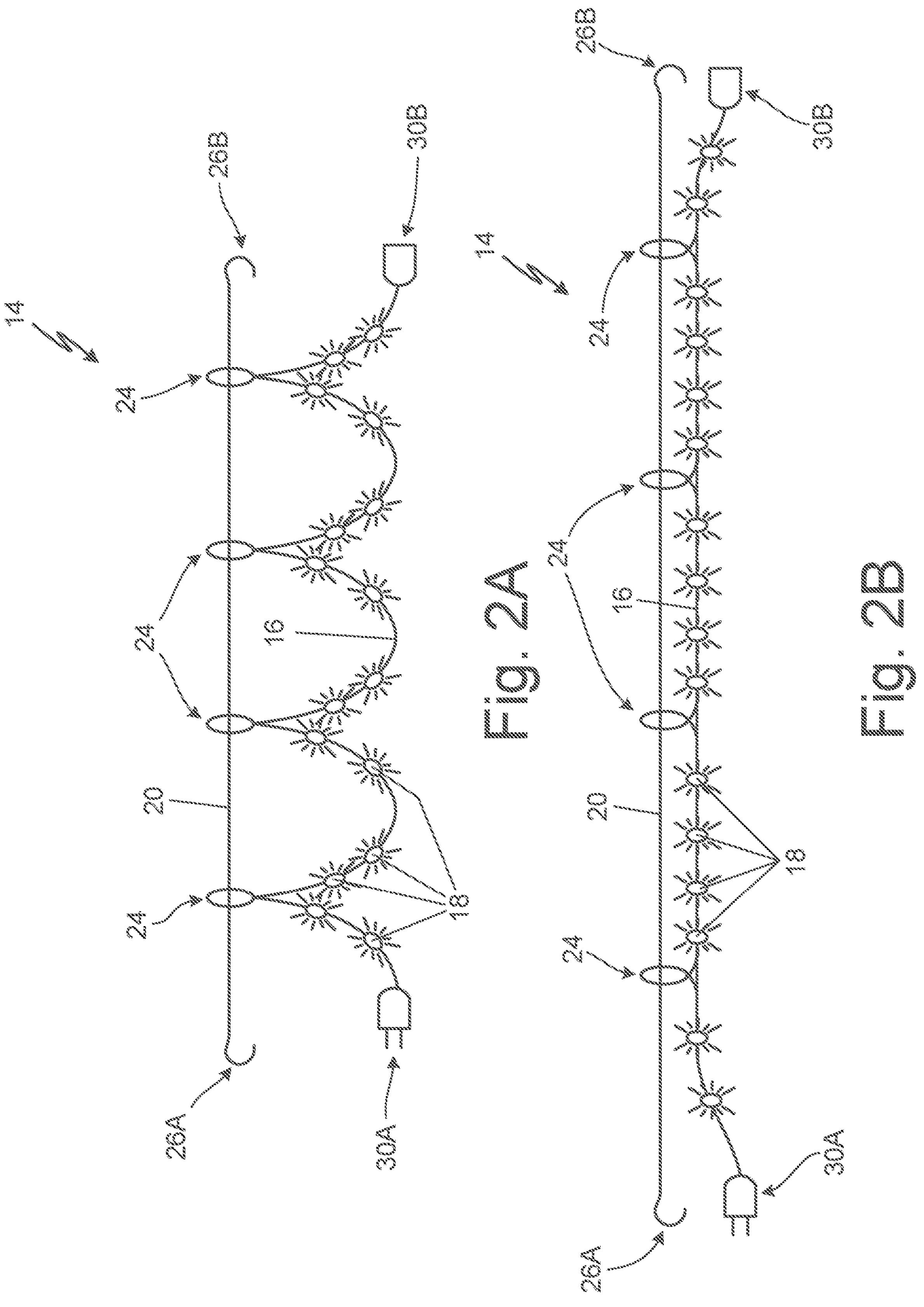
FIGS. 2A and 2B depict an example embodiment of an expandable light string that can adaptively span various lengths of a support structure.

FIGS. 2A and 2B depict an example embodiment of an expandable light string that can adaptively span various lengths of a support structure. In FIG. 2A, expandable light string 14 is depicted in a contracted state (i.e., elastic member 20 is in its natural state). In FIG. 2B, expandable light string 14 is depicted in an expanded state (i.e., elastic member 20 is in a stretched state). In both of the FIGS. 2A and 2B depictions, expandable light string 14 includes flexible backbone cable 16, lighting elements 18, and elastic member 20. Flexible backbone cable 16 has coupling members 24 distributed along a length of and attached to flexible backbone cable 16. Each coupling member 24 is slidably coupled with elastic member 20. Such coupling of flexible backbone cable 16 to elastic member 20 ensures effective length of flexible backbone cable 16 is commensurate with (e.g., substantially equal to) a length of elastic member 20, thereby resulting in expandable light string 14 spanning the length of the support structure from which it is hung.

Although the FIGS. 2A and 2B depictions show flexible backbone cable 16 without icicle tap strings 22, as depicted in FIG. 1, some embodiments include icicle tap strings 22 distributed alone flexible backbone cable 16. In some embodiments, each icicle tap string 22 extends from flexible backbone cable 16 at a tap location coincident with a location where a connecting member 22 is attached. In such a configuration, each icicle tap string 22 is supported by elastic member 20 via its associated connecting member 24.

Elastic member 20 has first and second support coupling members 26A and 26B attached at first and second ends 20A and 20B, respectively, of elastic member 20. First and second support coupling members 26A and 26B are configured to attach to a support structure, to which expandable light string 14 is to be attached. For example, first and second support coupling members 26A and 26B can be configured to be attached to a railing of a balcony, such as, for example, railing 12 of balcony 10 depicted in FIG. 1. In some embodiments, support coupling members 26A and 26B can be configured to couple to other support structures, such as, for example, eaves of a roof, window and/or door frames, etc. In the depicted embodiment, first and second support coupling members 26A and 26B are hooks. Various other types of devices can be used as support coupling members 26A and 26B, such as for example, spring-loaded clamps, screw-on clamps, hook-and-loop fastening straps, tie straps, etc.

Flexible backbone cable 16 has first and second electrical connectors 28A and 28B at each of first and second ends 16A and 16B of flexible backbone cable 16. First electrical connector 26A is configured to couple to a power source so as to receive electrical operating power therefrom. Second electrical connector 26B is configured to provide electrical operating power to another expandable light string (e.g., another expandable light string 14) connected thereto. In some embodiments, first and second electrical connectors 28A and 28B are complementary (e.g., first electrical connector 26A can be a male connector configured to couple with female second electrical connector 26B). In some embodiments, first and second electrical connectors 28A and 28B are standard electrical power connectors. In other embodiments, first and second electrical connectors 28A and 28B are low-voltage electrical power connectors. In some embodiments, flexible backbone cable 16 has only first electrical connector 26A for receiving electrical operating power and no second electrical connector 26B for providing electrical power. In other embodiments, flexible backbone cable 16 has no electrical connectors. In such embodiments, an electrical power source is hardwired to flexible backbone cable 16.

Figure 3A:
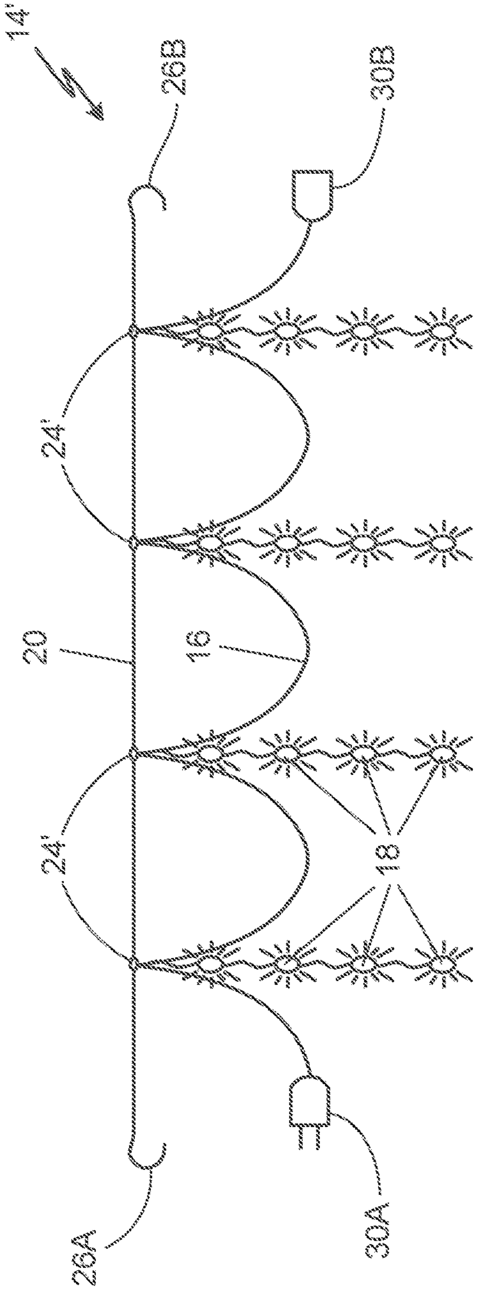
FIGS. 3A and 3B depict an example embodiment of an expandable light string that can adaptively span various lengths of a support structure.
Figure 3B:
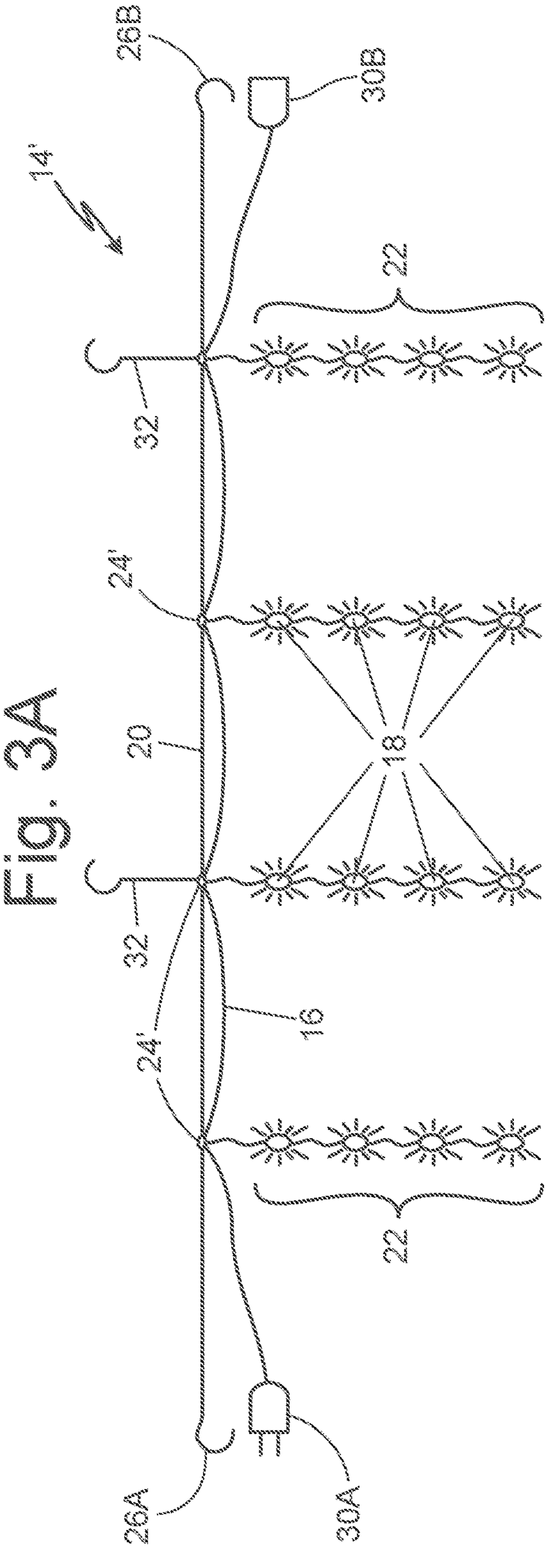

FIGS. 3A and 3B depict an example embodiment of an expandable light string that can adaptively span various lengths of a support structure. In FIG. 3A, expandable light string 14' is depicted in a contracted state (i.e., elastic member 20 is in its natural state). In FIG. 3B, expandable light string 14' is depicted in an expanded state (i.e., elastic member 20 is in a stretched state). In both of the FIGS. 3A and 3B depictions, expandable light string 14' includes flexible backbone cable 16, and elastic member 20, and icicle tap strings 22, along which are distributed lighting elements 18. In the FIGS. 3A and 3B embodiment, coupling members 24' are fixedly attached to both flexible backbone cable 16 and elastic member 20. In other embodiments, connecting members 24' can be slidably coupled to flexible backbone cable 16 and fixedly attached to elastic member 20. In still other embodiments, connecting members 24' can be slidably coupled to both flexible backbone cable 16 and to elastic member 20. Although the FIGS. 3A and 3B depictions show flexible backbone cable 16 with icicle tap strings 22, as depicted in FIG. 1, some embodiments do not include icicle tap strings 22 distributed along flexible backbone cable 16. Instead, in such embodiments, lighting elements 18 can be distributed in various other fashions, such as, for example, as light string with lighting elements distributed along backbone cable 16, or as a light curtain, with uniformly-long light strings descending from backbone cable 16.

In all the above-described embodiments, elastic member 20 is coupled to and supported by a structure via first and second support coupling members 26A and 26B. Elastic member 20 then supports flexible backbone cable 16 via connecting members 24 (and/or 24', etc.). Moreover, elastic member 20 adapts to a length dimension L that is commensurate with a distance between the first and second locations at which first and second support coupling members 26A and 26B couple to the support structure. Because flexible backbone cable 16 is connected to elastic member 20 at a series of corresponding connection locations along both flexible backbone cable 16 and elastic member 20, flexible backbone cable will appear to have a length dimension commensurate L that is also commensurate with the distance between the first and second locations at which first and second support coupling members 26A and 26B coupled to the support structure. Typically, flexible backbone cable 16 is not very elastic (i.e., very much less elastic than elastic member 20), though. Thus, flexible backbone cable 16 appears shorter than its true length because between connection members 24, flexible backbone cable 16 will not be taut when elastic member 20 has a length dimension that is less than the true length dimension of flexible backbone cable 16. In some embodiments, especially embodiments in which flexible backbone cable 16 is fixedly attached to elastic member 20, at least at ends 16A-B and 20A-B, support coupling members can be coupled to ends 16A and 16B of flexible backbone cable 16 instead of to ends 20A and 20B of elastic member 20. In such embodiments, a tensile force is applied to the first and second ends 20A and 20B of elastic member 20 via flexible backbone cable 16 and end elastic members 20, which fixedly attach flexible backbone cable 16 with elastic member 20.

Also depicted in the FIGS. 3A and 3B embodiment are intermediate support couplers 32, which are connected to expandable light string 14' between the first and second support coupling members 26A and 26B. Intermediate support couplers 32 are configured to releasably couple to railing 12 of the balcony or other structural support member, such as, for example, eaves of a roof. Such intermediate support couplers 32 can be used to reduce sagging of expandable lighting string 14' between support coupling members 26A and 26B. In some embodiments, only a single intermediate support coupler 32 is used approximately halfway between support coupling members 26A and 26B. Such intermediate support couplers 32 can couple expandable light string 14' to railing 12 after expandable light string 14' is hung from railing 12 using support coupling members 26A and 26B. Intermediate support structures 32 can be connected to flexible backbone cable 16 and/or elastic member 20.

Figure 4A:
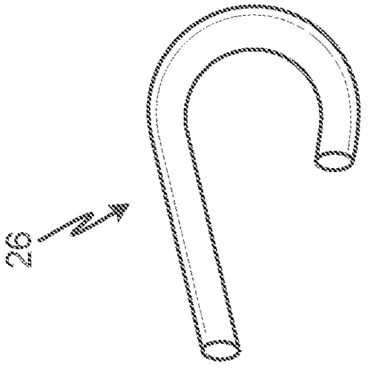
FIGS. 4A-4D depict examples of a support coupling members configured to attach an expandable light string to a support structure.
Figure 4B:
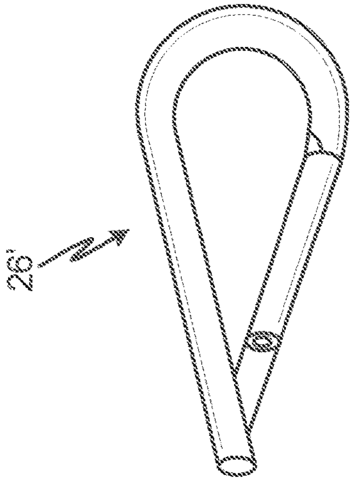
Figure 4C:
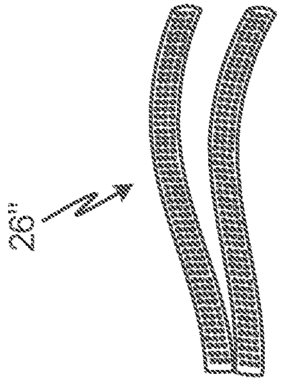
Figure 4D:
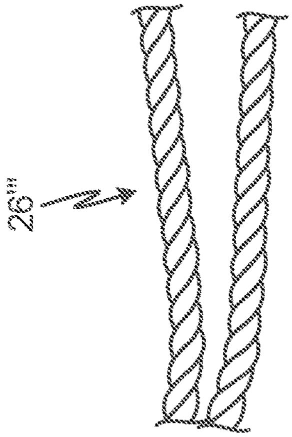
Figure 4E:
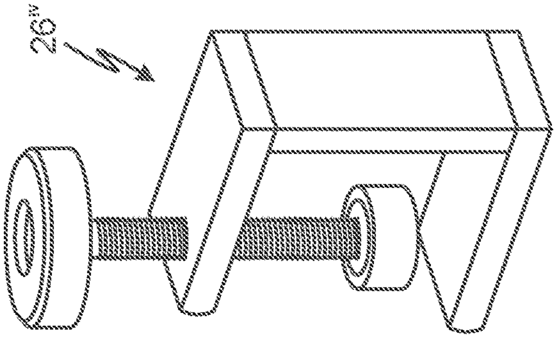

FIGS. 4A-4E depict examples of a support coupling members configured to attach an expandable light string to a support structure. In FIG. 4A, support coupling member 26 is a hook. Hook 26 can be configured to attach to a top member or a vertical member of a railing 12, for example. In FIG. 4B, support coupling member 26' is a hook with a spring-loaded gate. Such a spring-loaded gate can secure the hook $\mathbf{26}^{I}$ to a supporting structure. In FIG. 4C, support coupling member $\mathbf{26}^{II}$ is a pair of hook-and-loop fastening straps. Such hook-and-loop fasteners $\mathbf{26}^{II}$ can be affixed to support structures having a variety of different configurations. In FIG. 4D, support coupling member $\mathbf{26}^{III}$ is tie straps. In FIG. 4E, support coupling member $\mathbf{26}^{IV}$ is a screw-on clamp. Such screw-on clamps $\mathbf{26}^{IV}$ can be used to provide secure coupling to objects unable to be secured by hooks, etc.

In some embodiments, different types of support coupling members 26 can be used in combination. For example, hook 26 can be used in combination with hook-and-loop fastening straps $\mathbf{26}^{II}$. Such a combination can provide a choice of how to couple expandable light string 14 to a structural support member. Moreover, such a combination can be simultaneously. For example, hook 26 can be used to coupled to a vertical member of railing 12, while hook-and-loop fastening straps $\mathbf{26}^{II}$ is used to secure expandable light string 14 to a top member of railing 12. These same structures (i.e., hook 26, hook with spring-loaded gate $\mathbf{26}^{I}$, hook-and-loop fasteners $\mathbf{26}^{II}$, tie strap $\mathbf{26}^{III}$, screw-on clamps $\mathbf{26}^{IV}$, etc.). can be used as intermediate support couplers as well.

Figure 5:
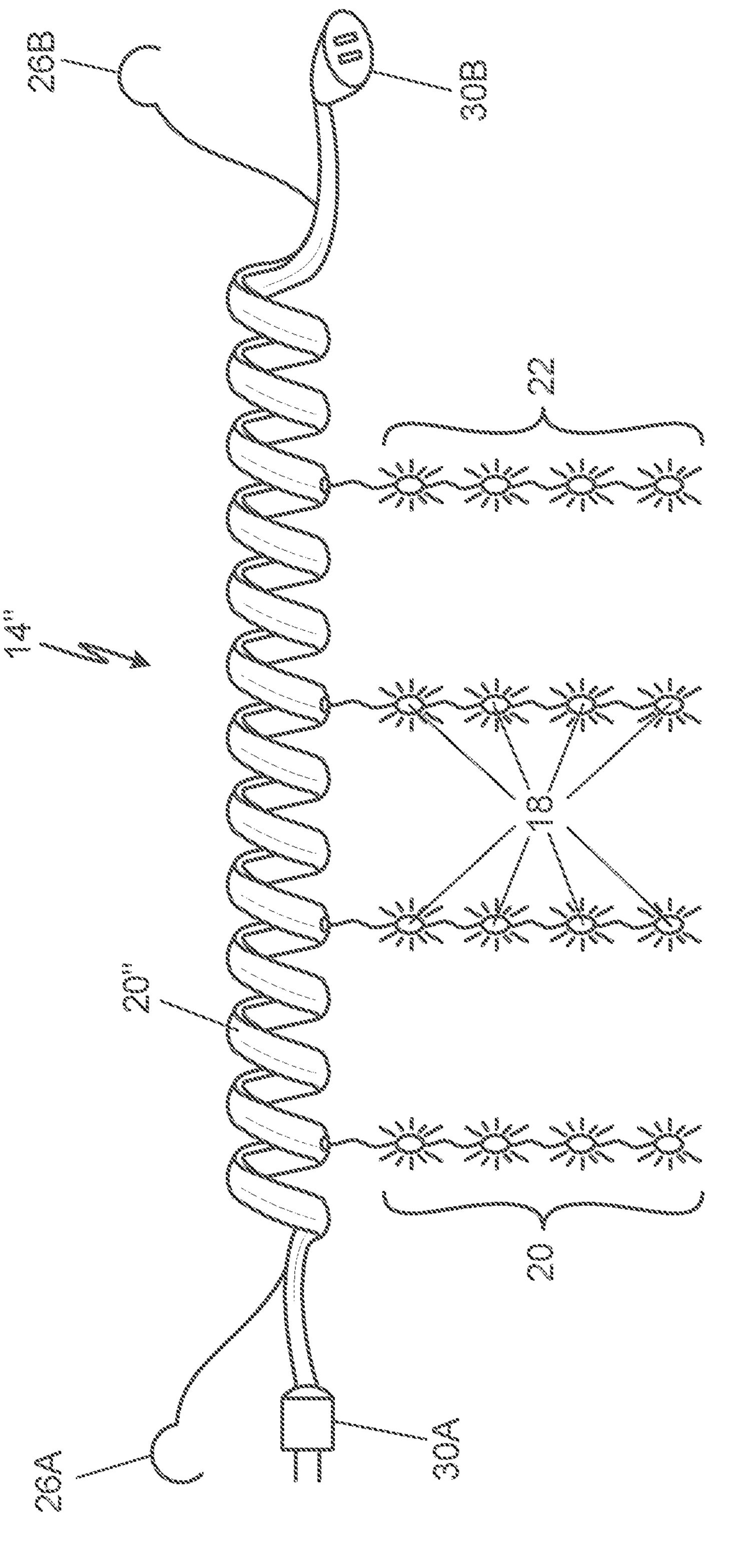
FIG. 5 depicts an example embodiment of an expandable light string that has a coiled-spring expandable member.

FIG. 5 depicts an example embodiment of an expandable light string that has a coiled-spring expandable member. In FIG. 5, expandable light string 14" includes flexible backbone cable 16, lighting elements 18 and coiled spring member 20'. Coiled-spring member 20' is continuously coupled to flexible backbone cable 16 along most, if not all, of its length. Coiled-spring member 20' can be expanded from a coiled length $L_{MIN}$ to a maximum length $L_{MAX}$. Such a coiled-spring member 20' operates in a fashion similar to old-fashioned coiled phone cords. Coiled-spring member 20' has an effective length dimension L between first and second ends 20A' and 20B' that increases as a tensile force is applied to ends 20A' and 20B' of coiled-spring member 20'. The effective length dimension L between the first and second ends 20A' and 20B' of coiled-spring member 20' contracts or reduces in response to a reduction in the tensile force applied to the first and second ends 20A' and 20B' of coiled-spring member 20'. Regardless of whether elastic member 20 or coiled spring member 20' in included in the expandable light string 14, a single expandable member extends between first and second coupling members. Such a single expandable member permits quick and easy installation of expandable light string 14 by attaching expandable lights string at two locations of a supporting structure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An expandable light string comprising:

a flexible backbone cable having a plurality of conductive wires extending and providing electrical conduction along a length between a first end and a second end of the flexible backbone cable, the plurality of conductive wires configured to receive electrical operating power from a power source;

a plurality of lighting elements, each conductively coupled to at least two of the plurality of conductive wires of the flexible backbone cable so as to illuminate in response to receiving electrical operating power therefrom; and a single expandable member coupled at a plurality of coupling locations to the flexible backbone cable along the length thereof, the single expandable member configured to expand, in response to a tensile force applied to first and second ends of the single expandable member, so that a length between the first and second ends of the single expandable member increases, and to contract, in response to a reduction in the tensile force applied to the first and second ends of the single expandable member, so that the length between the first and second ends of the single expandable member decreases, wherein a distance between the first and second ends of the flexible backbone cable changes in response to changes in the length of the single expandable member.

2. The expandable light string of claim 1, further comprising:

a plurality of icicle tap strings distributed along the flexible backbone cable, each coupled at a first end to the flexible backbone cable at a tapping location and extending to a second end, each of the plurality of icicle tap strings having a subset of the plurality of lighting elements.

3. The expandable light string of claim 1, further comprising:

an electrical connector coupled to the flexible backbone cable, the electrical connector configured to receive the electrical operating power form a power source and to provide the electrical operating power to the plurality of conductive wires of the flexible backbone cable.

4. The expandable light string of claim 3, further comprising:

the power source.

5. The expandable light string of claim 4, wherein the power source includes a solar power converter.

6. The expandable light string of claim 5, wherein the power source has a clamping mechanism configured to releasable couple to a railing of a balcony.

7. The expandable light string of claim 4, further comprising:

a battery configured to be charged by the solar power converter in response to sunlight shining on the solar power converter and to provide the electrical operating power to the plurality of conductive wires of the flexible backbone cable.

8. The expandable light string of claim 1, wherein the single expandable member is a coiled spring, which is continuously coupled to the flexible backbone cable.

9. The expandable light string of claim 1, further comprising:

a plurality of coupling members distributed along the length between the first end and the second end of the flexible backbone cable.

10. The expandable light string of claim 9, wherein the single expandable member is an elastic member.

11. The expandable light string of claim 10, wherein each of the plurality of coupling members is fixedly attached to the flexible backbone cable and slidably coupled to the elastic member.

12. The expandable light string of claim 10, wherein each of the plurality of coupling members is slidably coupled to the flexible backbone cable and fixedly attached to the elastic member.

13. The expandable light string of claim 10, wherein each of the plurality of coupling members is fixedly attached to the flexible backbone cable and fixedly attached to the elastic member.

14. The expandable light string of claim 10, wherein each of a first and a last of the plurality of coupling members is fixedly attached to the flexible backbone cable and fixedly attached to the elastic member and each of the plurality of coupling between the first and the last of the plurality of coupling members is fixedly attached to the flexible backbone cable and slidably coupled to the elastic member.

15. The expandable light string of claim 1, further comprising:

a first support coupling member connected to the expandable light string at a first end thereof; and a second support coupling member connected to the expandable light string at a second end thereof.

16. The expandable light string of claim 15, wherein each of the first and second support coupling members is configured to releasable couple to a railing of a balcony.

17. The expandable light string of claim 15, wherein each of the first and second support coupling members is configured to releasable couple to eaves of a house.

18. The expandable light string of claim 15, wherein each of the first and second support coupling members is a hook.

19. The expandable light string of claim 15, wherein the first support coupling member is connected to the elastic member at the first end, and the second support coupling member is connected to the elastic member at the second end.

20. The expandable light string of claim 15, wherein each of the first and second support coupling members is connected to the flexible backbone cable.

21. The expandable light string of claim 15, wherein each of the first and second support coupling members is connected to the single expandable member.

22. The expandable light string of claim 16, further comprising:

one or more intermediate support couplers connected to the expandable light string between the first and second support coupling member, wherein each of the one or more intermediate support couplers is configured to releasable couple to the railing of the balcony.

* * * * *